United States Patent [19]
Sugawara

[11] Patent Number: 5,986,806
[45] Date of Patent: Nov. 16, 1999

[54] DECENTERED OPTICAL SYSTEM

[75] Inventor: Saburo Sugawara, Kawasaki, Japan

[73] Assignee: Canon Kabushiki Kaisha, Tokyo, Japan

[21] Appl. No.: 08/960,252

[22] Filed: Oct. 29, 1997

[30] Foreign Application Priority Data

Nov. 1, 1996 [JP] Japan .................................... 8-307153

[51] Int. Cl.[6] .................................................. G02B 27/64
[52] U.S. Cl. .......................... 359/557; 359/554; 359/649
[58] Field of Search .......................... 359/362, 554–557, 359/649–651, 744, 794; 353/69

[56] References Cited

U.S. PATENT DOCUMENTS

| | | | |
|---|---|---|---|
| 3,051,043 | 8/1962 | Miller | 359/794 |
| 4,573,769 | 3/1986 | Clarke | 359/651 |
| 5,475,534 | 12/1995 | Okajima et al. | 359/649 |
| 5,550,679 | 8/1996 | Sugawara | 359/689 |
| 5,552,938 | 9/1996 | Sugawara | 359/691 |
| 5,600,490 | 2/1997 | Sugawara et al. | 359/690 |
| 5,648,871 | 7/1997 | Okuyama et al. | 359/651 |

FOREIGN PATENT DOCUMENTS

5-273460  10/1993  Japan .

*Primary Examiner*—Thong Nguyen
*Attorney, Agent, or Firm*—Fitzpatrick, Cella, Harper & Scinto

[57] ABSTRACT

A decentered optical system has a first lens unit having positive refractive power and a second lens unit having positive refractive power arranged in the order in which they are listed from a screen to a liquid crystal display device. Each of the first and second lens units includes a lens surface which is tilted and decentered with respect to the surface of the foregoing liquid crystal display device. The decentered optical system permits reduction in the sizes of the lenses used while maintaining good optical performance at the same time.

19 Claims, 12 Drawing Sheets

| | | |
|---|---|---|
| Y −8.59°<br>Z 0° | Y −8.59°<br>Z −11.8° | Y −8.59°<br>Z −22.6° |
| Y 0°<br>Z 0° | Y 0.39°<br>Z −11.8° | Y 0.39°<br>Z −22.6° |
| Y 9.35°<br>Z 0° | Y 9.34°<br>Z −11.8° | Y 9.3°<br>Z −22.6° |
| Y 17.84°<br>Z 0° | Y 17.82°<br>Z −11.8° | Y 17.73°<br>Z −22.6° |
| Y 25.53°<br>Z 0° | Y 25.49°<br>Z −11.8° | Y 25.31°<br>Z −22.6° |

DECENTERED OPTICAL SYSTEM

BACKGROUND OF THE INVENTION

1. Field of the Invention

The present invention relates to a decentered optical system and a projecting apparatus employing the same which are ideally used for a liquid crystal projector or the like and which successfully correct distortion, trapezoidal distortion, the fall of an image surface, etc. by properly setting the lens configuration of the decentered optical system so as to provide a projection image having good optical characteristics when, for example, magnifying and projecting an original projected image, which is displayed on a liquid crystal display device or the like, onto a screen from a slant direction.

2. Description of Related Art

Figure 12:
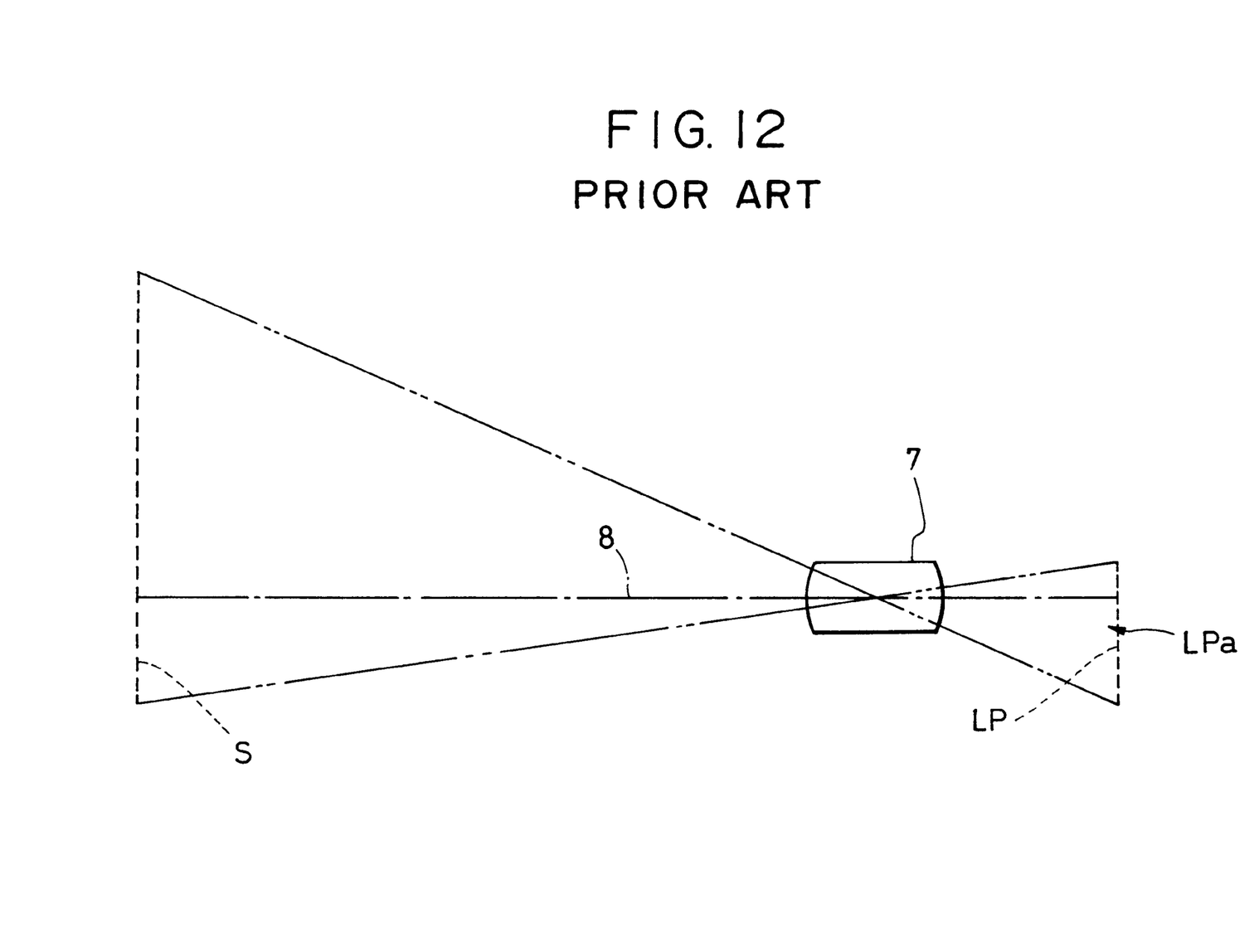
FIG. 12 is a schematic illustration of an essential section of a conventional projecting apparatus.

Hitherto, a variety of projecting apparatuses or liquid crystal projectors for projecting an image, namely, a projection image original picture, which is displayed on a liquid crystal display device, onto a screen have been proposed. FIG. 12 is a schematic diagram illustrating an oblique projection type projecting apparatus which projects a projection image original picture LP onto a screen surface S in a slant direction through a projection lens 7 for the purpose of observation.

The projecting apparatus shown in the drawing makes use of a screen shift in which the center LPa of the projection image original picture LP is shifted downward with respect to an optical axis 8 of a projection lens assembly 7 in order to prevent the projection image from being distorted when projecting the projection image original picture LP on a screen S.

There is a related art disclosed in Japanese Unexamined Patent Publication No. 5-273460.

In the projecting apparatus shown in FIG. 12, the projection image original picture LP is shifted downward in relation to the optical axis 8 of the projection lens assembly 7. For this reason, it is required to make an image circle, i.e. an effective screen, of the projection lens 7 assembly considerably larger than the diagonal dimension of the projection image original picture. This has been leading to the tendency toward larger size and more complexity of the projection lens assembly 7.

SUMMARY OF THE INVENTION

Accordingly, it is an object of the present invention to provide a decentered optical system which is capable of successfully correcting distortion, trapezoidal distortion, the fall of an image surface, etc. when obliquely projecting a projection image original picture while reducing the size of the entire optical system and maintaining the optical characteristics as good as those obtained by screen shift at the same time, by decentering some lenses of the optical system, and also to provide a projecting apparatus which employs the decentered optical system.

To this end, according to one aspect of the present invention, there is provided a decentered optical system having two lens units, namely, a first lens unit of positive refractive power and a second lens unit of positive refractive power in the order in which they are listed from the side of a first conjugate surface at a longer distance, wherein the first lens unit and the second lens unit include lens surfaces which are tilted and decentered with respect to a normal line to a second conjugate surface at a shorter distance.

In a preferred form, the first conjugate surface and the second conjugate surface are parallel.

In another preferred form, the normal line based on the center of the first conjugate surface does not coincide with the normal line based on the center of the second conjugate surface.

In yet another preferred form, the lens surfaces of the first lens unit and the second lens unit which are tilted and decentered with respect to the second conjugate surface are tilted in different directions from each other with respect to the second conjugate surface, whereas the lens surface, which is tilted and decentered with respect to the second conjugate surface in the first lens unit, is tilted in the same direction as the direction in which the normal line connecting the center of the first conjugate surface and the center of the second conjugate surface is tilted with respect to the normal line of the second conjugate surface.

In a further preferred form, the second lens unit is composed of a single positive lens and the lens surface thereof on the side of the first conjugate surface relatively has greater positive refractive power than the lens surface on the side of the second conjugate surface.

In a preferred form, the positive lens in the second lens unit is composed of a planoconvex lens with its convex surface facing to the first conjugate surface.

In a further preferred form, each of the first lens unit and the second lens unit contains a free curved surface having one or less axis of symmetry.

In a further preferred form, the free curved surface included in the first lens unit is positioned closer to the first conjugate surface from the center of the overall length of the lens assembly of the first lens unit.

In a further preferred form, the first lens unit has a plurality of lenses, and at least one among the plurality of lenses is decentered with respect to the optical axis of the first lens unit.

In a preferred form, the pupil of the first lens unit on the side of the second conjugate surface is located between the first lens unit and the second lens unit.

In a further preferred form, the first lens unit and the second lens unit are disposed with a largest air interval provided therebetween.

In a further preferred form, the first lens unit has a free curved surface lens having a free curved surface, a plurality of lenses having optical axes tilted and decentered relative to the axis of center which is the normal line drawn on the second conjugate surface, and a plurality of lenses decentered in parallel in relation to the optical axes, in the order in which they are listed from the side of the first conjugate surface.

In a further preferred form, there is a stop, which is tilted with respect to the foregoing axis of center, on the side of the second conjugate surface of the first lens unit.

In a further preferred form, the second lens unit is composed of a planoconvex lens which has a plane tilted in relation to the second conjugate surface.

According to another aspect of the present invention, there is provided a projecting apparatus which employs the decentered optical system having two lens units, namely, a first lens unit of positive refractive power and a second lens unit of positive refractive power in order from the side of a first conjugate surface at a longer distance, wherein the first lens unit and the second lens unit include lens surfaces which are tilted and decentered with respect to a second conjugate surface at a shorter distance; and wherein the normal line based on the center of the first conjugate surface does not coincide with the normal line based on the center of the second conjugate surface.

DESCRIPTION OF THE PREFERRED EMBODIMENTS

Figure 1:
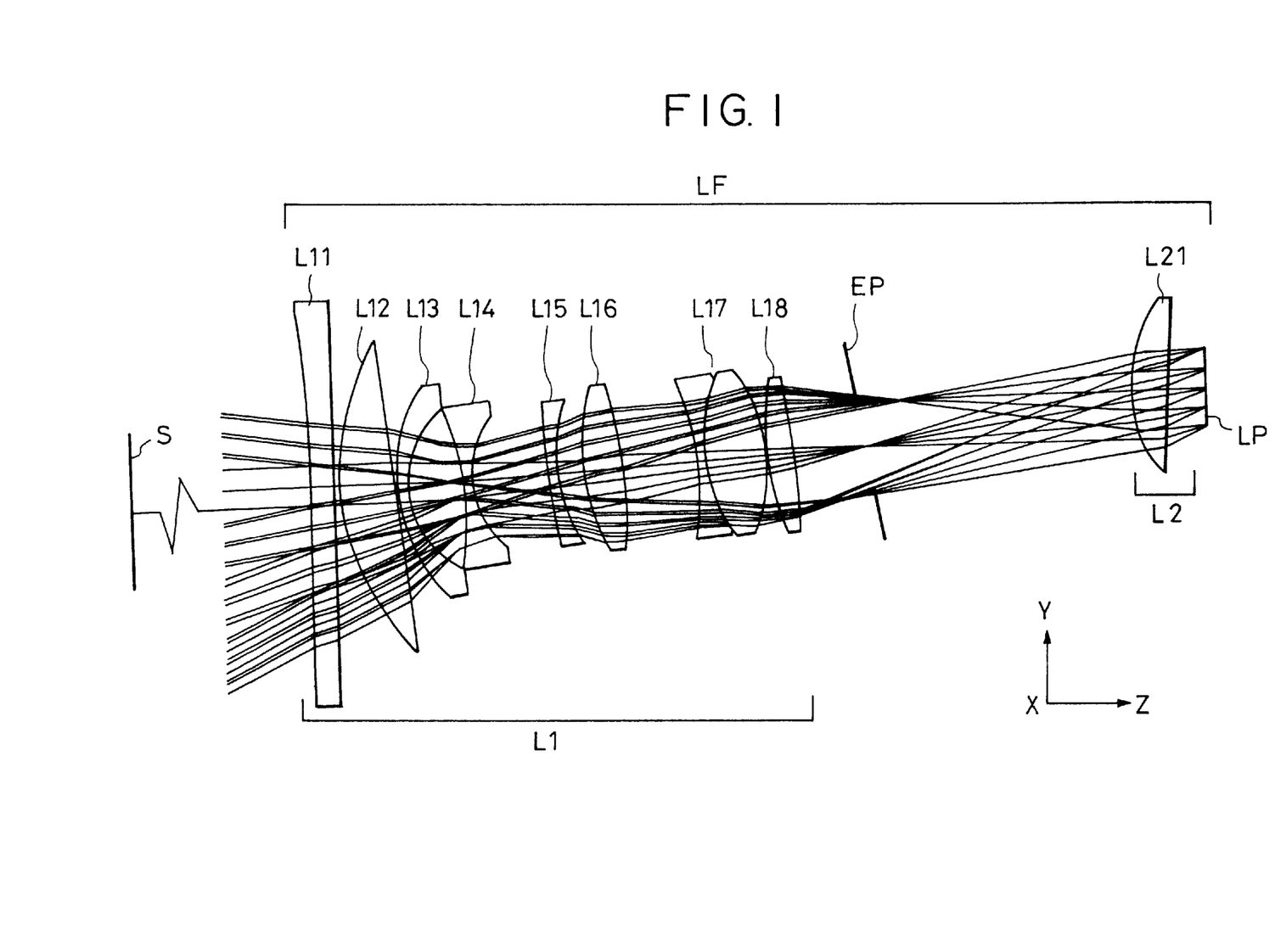
FIG. 1 is a sectional view in a direction of YZ of a first numerical embodiment in accordance with the present invention.
Figure 2:
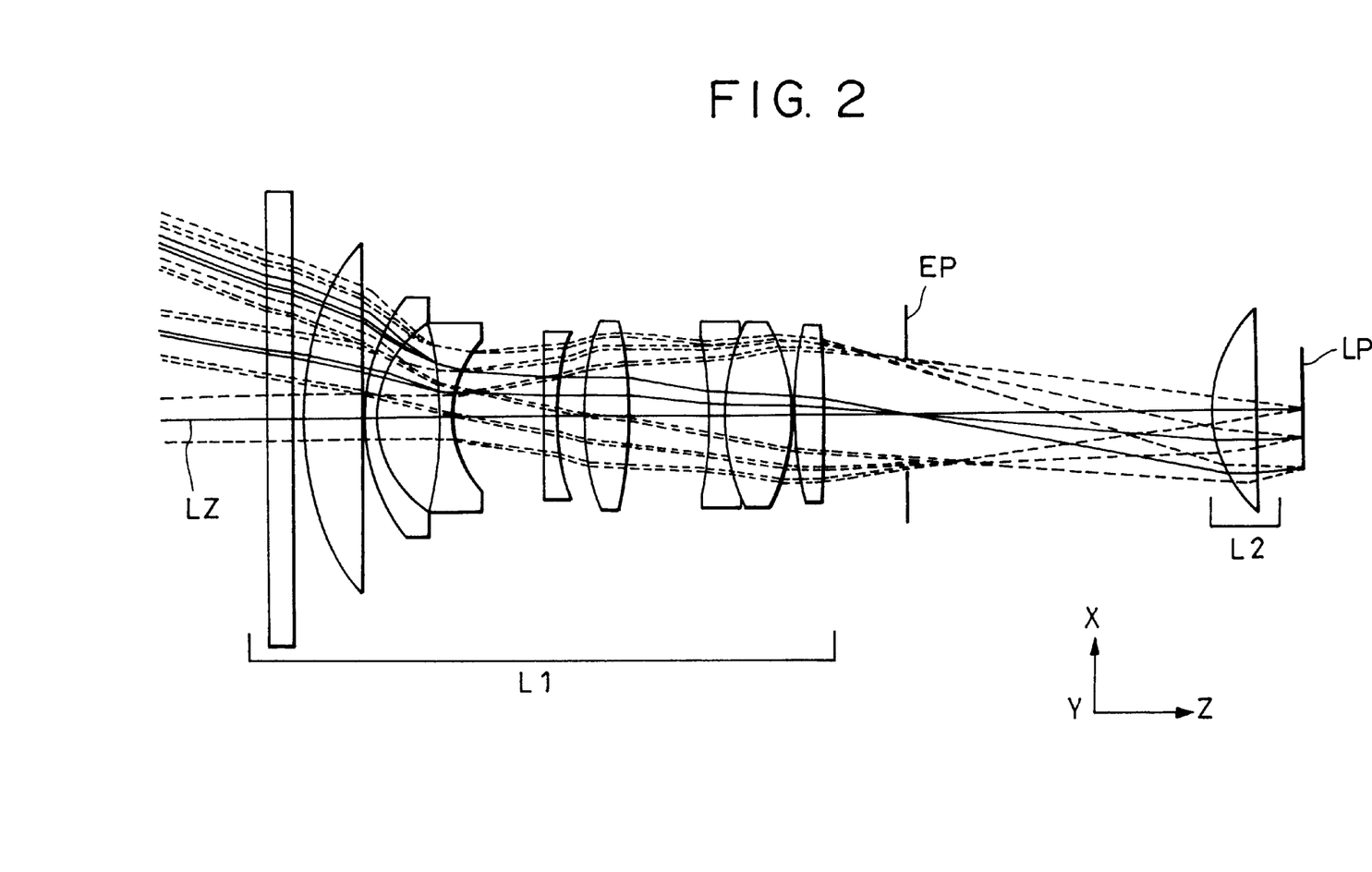
FIG. 2 is a sectional view in a direction of XZ of the first numerical embodiment in accordance with the present invention.
Figure 3:
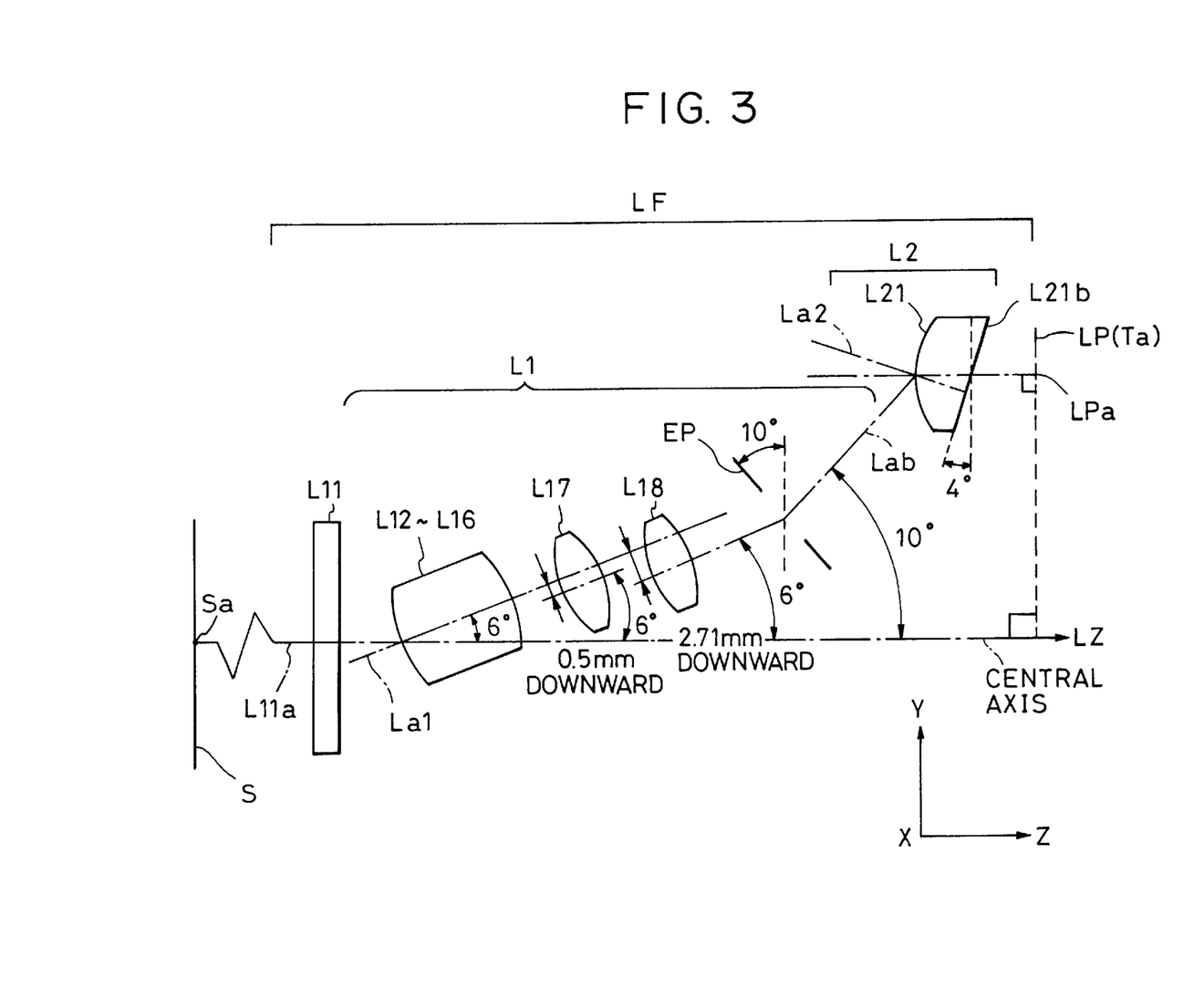
FIG. 3 is a schematic sectional view in the direction of YZ of the first numerical embodiment in accordance with the present invention.

FIG. 1 and FIG. 2 are YZ and XZ sectional views, respectively, of the lens configuration of a first numerical embodiment of a decentered optical system in accordance with the present invention; and FIG. 3 is a schematic diagram of the lens configuration of the YZ section of the first numerical embodiment. In this embodiment, the Z-axis is perpendicular to a projection surface LP which will be discussed later.

In the drawings, LF denotes a decentered optical system, i.e. a projection lens assembly, which has a first lens unit L1, a stop EP, and a second lens unit L2. The first lens unit and the second lens unit are disposed with a largest air interval provided therebetween; a mirror for combining colors will be disposed in the air interval.

A screen S is disposed on the side of a first conjugate point (hereinafter referred to also as "on the side of an object") at a long distance. Character LP, which denotes a projection surface such as a liquid crystal device or the like, is located on the side of a second conjugate point (hereinafter referred to also as "on the side of an image surface") at a short distance. A projection image original picture Ta is located on the projection surface LP.

In this embodiment, the projection image original picture Ta displayed on the liquid crystal display device provided on the projection surface LP is magnified and projected from an oblique direction onto the screen surface S through the decentered optical system LF. The screen S and the projection image original picture Ta are parallel to each other in this embodiment; however, they may be inclined with respect to each other.

This embodiment is configured such that an optical axis La1 of the first lens unit L1 and an optical axis La2 of the second lens unit L2 of the decentered optical system LF, wherein the normal line based on the center of the first conjugate surface does not coincide with the normal line based on the center of the second conjugate surface, can be tilted and decentered with respect to a normal line LZ of the projection image original picture Ta (the normal line will be referred to as the "central axis" hereinafter).

Each of the first lens unit and the second lens unit is provided with a lens surface composed of a free curved surface having one or less axis of symmetry. The free curved surface is different from that of a conventional spherical or nonspherical lens; it has one or less, i.e. zero or one, axis of symmetry. This successfully corrects trapezoidal distortion, the fall of an image surface, decentering comatic aberration, distortive aberration, etc. when projecting the projection image original picture Ta on the screen surface S from an oblique direction.

The characteristics of the lens configuration of the decentered optical system LF of this embodiment will now be described.

The first lens unit L1 is constituted by: a free curved surface lens L11 in which the lens surface on the side of the object is a free curved surface; a positive lens L12 which has high positive power or refractive force on the side of the object; a meniscus-shaped negative lens L13 which has its convex surface facing the object; a negative lens L14 in which both lens surfaces are concave; a negative lens L15 which has high negative power on the side of the image surface; a positive lens L16 in which both lens surfaces are convex; a combined positive lens L17 which is composed of a negative lens and a positive lens bonded together and which has high positive power on the side of the image surface; and a positive lens L18 in the order in which they are listed from the side of the object. The second lens unit L2 is composed of a planoconvex positive lens L21 in which the convex surface thereof faces to the object and the convex surface is a free curved surface.

In FIG. 1 and FIG. 3, the projection image original picture Ta is projected a slant downward onto the screen S. The optical axis La1 of the first lens unit L1 is disposed a slant counterclockwise with respect to the normal line LZ of the projection surface, i.e. the image surface. The lens surface L21b of the second lens unit L2 on the side of the image surface is composed of a plane which is tilted clockwise in relation to the projection surface LP. The optical axis La1 of the first lens unit L1 indicates the optical axis shared by the greatest number of lenses among a plurality of lenses included in the first lens unit L1.

To be more specific, the optical axis shared by the lenses from the second lens L12 to the sixth lens L16 of the first lens unit L1 from the side of the object is specified as the optical axis La1 of the first lens unit L1; the optical axis La1 is tilted counterclockwise by six degrees in relation to the normal line LZ to the projection surface LP. An optical axis L11a of the first lens L11 of the first lens unit L1 on the side of the object is parallel to the normal line LZ to the projection surface LP; it is tilted clockwise by six degrees in relation to the optical axis La1 of the first lens unit L1. The seventh combined positive lens L17 of the first lens unit L1 from the side of the object is decentered parallel by 0.5 mm downward in the drawing (in the direction of Y) with respect to the optical axis La1 of the first lens unit L1.

Further, the eighth positive lens L18 of the first lens unit from the object is decentered parallel by 2.71 mm downward in the drawing with respect to the optical axis La1. The axis Lab connecting the center of an entrance pupil EP and the second lens unit L2 is tilted counterclockwise by four degrees with respect to the optical axis La1 and tilted counterclockwise by ten degrees with respect to the central axis LZ. The lens surface, i.e. the plane, of the second lens unit L2 on the side of the image surface is tilted clockwise by four degrees with respect to the projection surface LP. The stop EP is located such that the entrance pupil of the first lens unit L1 is located between the first lens unit L1 and the second lens unit L2.

The perpendicular drawn from the center of the curved surface of the lens surface of the lens L21 (the center if the lens surface has a free curved surface) down to a plane L21b is specified as the optical axis La2.

The optical axis La1 and the optical axis La2 are tilted in different directions from each other with respect to the second conjugate surface LP. The optical axis La1 is tilted in the same direction as the line segment which connects a center Sa of the first conjugate surface S and a center LPa of the second conjugate surface LP and which is tilted with respect to the central axis LZ.

In the XZ section of FIG. 2, the respective lens elements of the decentered optical system LF are not decentered; they are coaxial in relation to the central axis LZ.

The optical operation of each lens will now be described. If the projection image original picture Ta on the projection surface LP employs a transmission twisted nematic liquid crystal, then the contrast would vary from one place to another on the liquid crystal surface unless the illuminating rays are launched at about the same angle over the entire liquid crystal surface. Hence, it is necessary to apply the illuminating rays to the liquid crystal surface in the form of approximately parallel rays.

If the projection image original picture Ta disposed on the projection surface LP employs a reflection liquid crystal, then the amount of light launched in the entrance pupil EP of the projection lens LF would vary from one place to another on the liquid crystal surface unless the illuminating rays are launched parallel at an approximately identical angle over the entire liquid crystal surface. Hence, it is necessary to apply the illuminating rays to the liquid crystal surface in the form of approximately parallel rays.

For the reasons described above, in this embodiment, the illuminating rays from a light source are formed into parallel rays, and the positive lens L21 of the second lens unit for converging the reflected rays, which have been modulated through the liquid crystal, to the entrance pupil EP of the projection lens LF is disposed on the side of the screen S of the liquid crystal.

The lens surface (plane) of the second lens unit L2 on the side of the image surface is inclined clockwise in relation to the projection surface LP to correct the fall of the image surface on the screen surface, i.e. the large conjugate surface, caused by oblique projection. Likewise, the free curved surface is employed as the convex surface of the second lens unit L2 on the side of the screen S in order to correct the trapezoidal distortion caused by the oblique projection. In addition, a free curved surface lens, in which the lens surface closest to the screen S in the first lens unit L1 is a free curved surface, is provided to make further correction of trapezoidal distortion.

Thus, the decentering distortive aberration, i.e. the trapezoidal distortion, attributable to oblique projection is successfully corrected by employing the lens surface of the free curved surface such that the normal line based on the center of the first conjugate surface does not coincide with the normal line based on the center of the second conjugate surface (i.e. the free curved surface is located at the point far from the optical axis of the off axial principal rays). Moreover, the positive lens L12 is disposed as the second lens of the first lens unit L1 from the screen S in order to successfully correct the magnification color aberration or astigmatic aberration attributed to the planoconvex lens L21 of the second lens unit L2.

Further, the combined lens L17, which is the seventh lens of the first lens unit, and the eighth positive lens L18 are decentered parallel downward with respect to the optical axis La1 in FIG. 1 so as to correct the decentering comatic aberration which takes place in the second lens unit L2.

Further, the distortive aberration is successfully corrected by providing the meniscus-shaped negative lens L13 which has its convex surface facing to the object as the third lens of the first lens unit L1 from the screen S, and also providing the negative lens L14, both surfaces of which are concave.

Thus, this embodiment is configured so that the first lens unit is composed of the free curved surface lens having the free curved surface, a plurality of lenses having optical axes tilted and decentered with respect to the central axis which is the normal line drawn onto the second conjugate surface, and a plurality of lenses decentered parallel to the foregoing optical axes in the order in which they are listed from the first conjugate surface; and the second lens unit is composed of the planoconvex lens having the plane inclined in relation to the second conjugate surface. This configuration enables successful correction of various types of aberrations when projecting aslant a projection image original picture onto a screen.

No lens in the XZ section of FIG. 2 is decentered; the respective lenses are disposed symmetrically with respect to the optical axis La.

Figure 4:
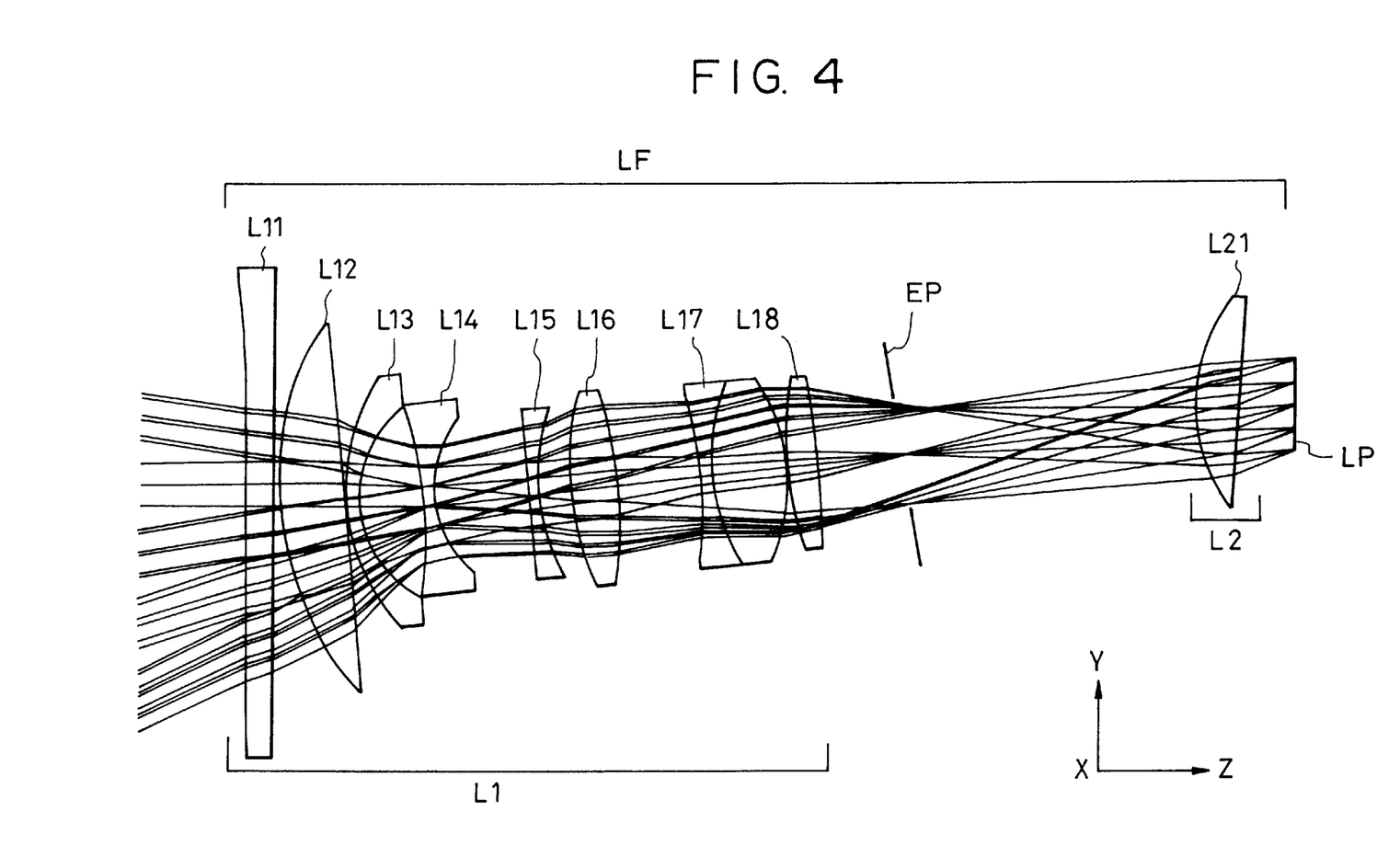
FIG. 4 is a sectional view in the direction of YZ of a second numerical embodiment in accordance with the present invention.
Figure 5:
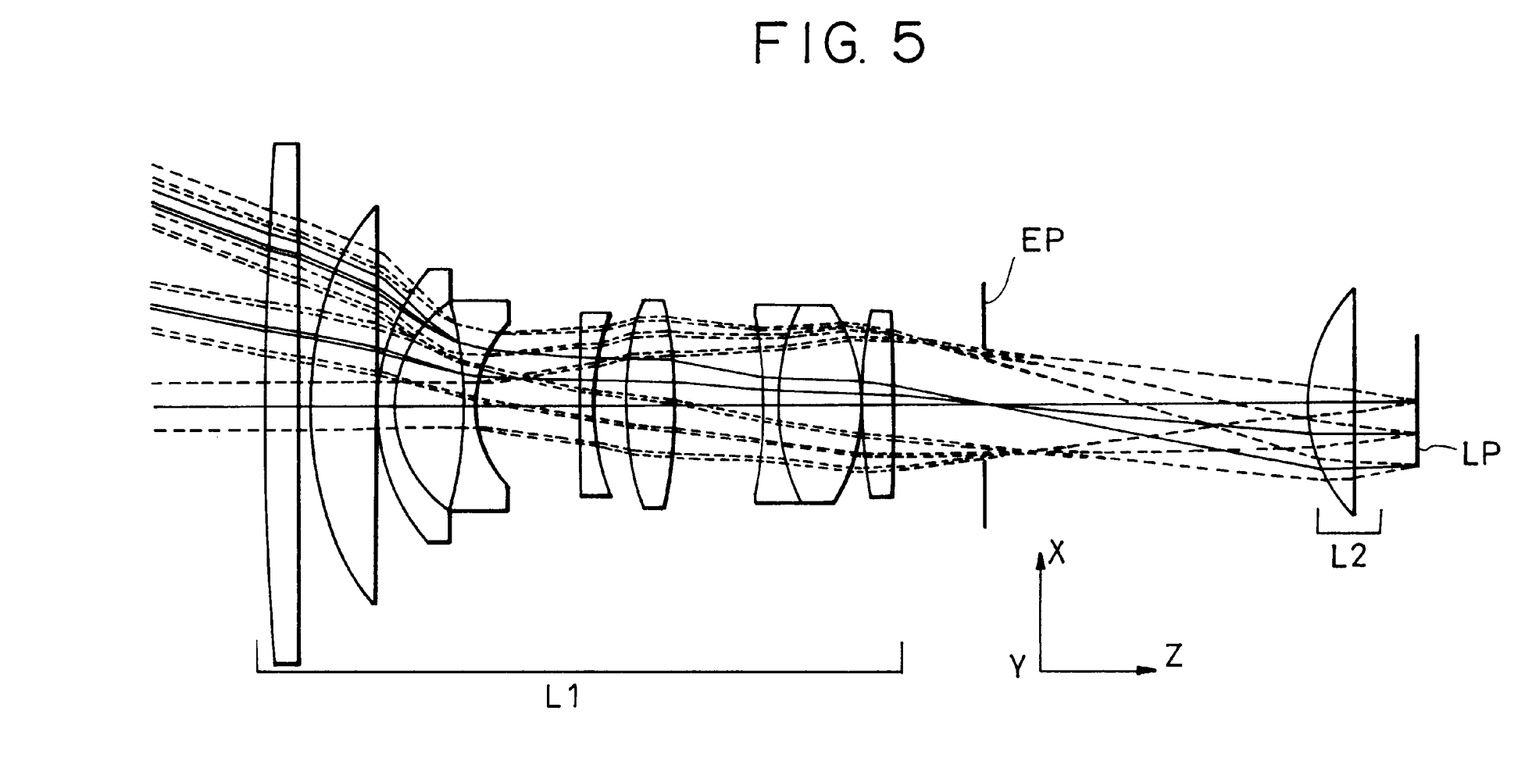
FIG. 5 is a sectional view in the direction of XZ of the second numerical embodiment in accordance with the present invention.
Figure 6:
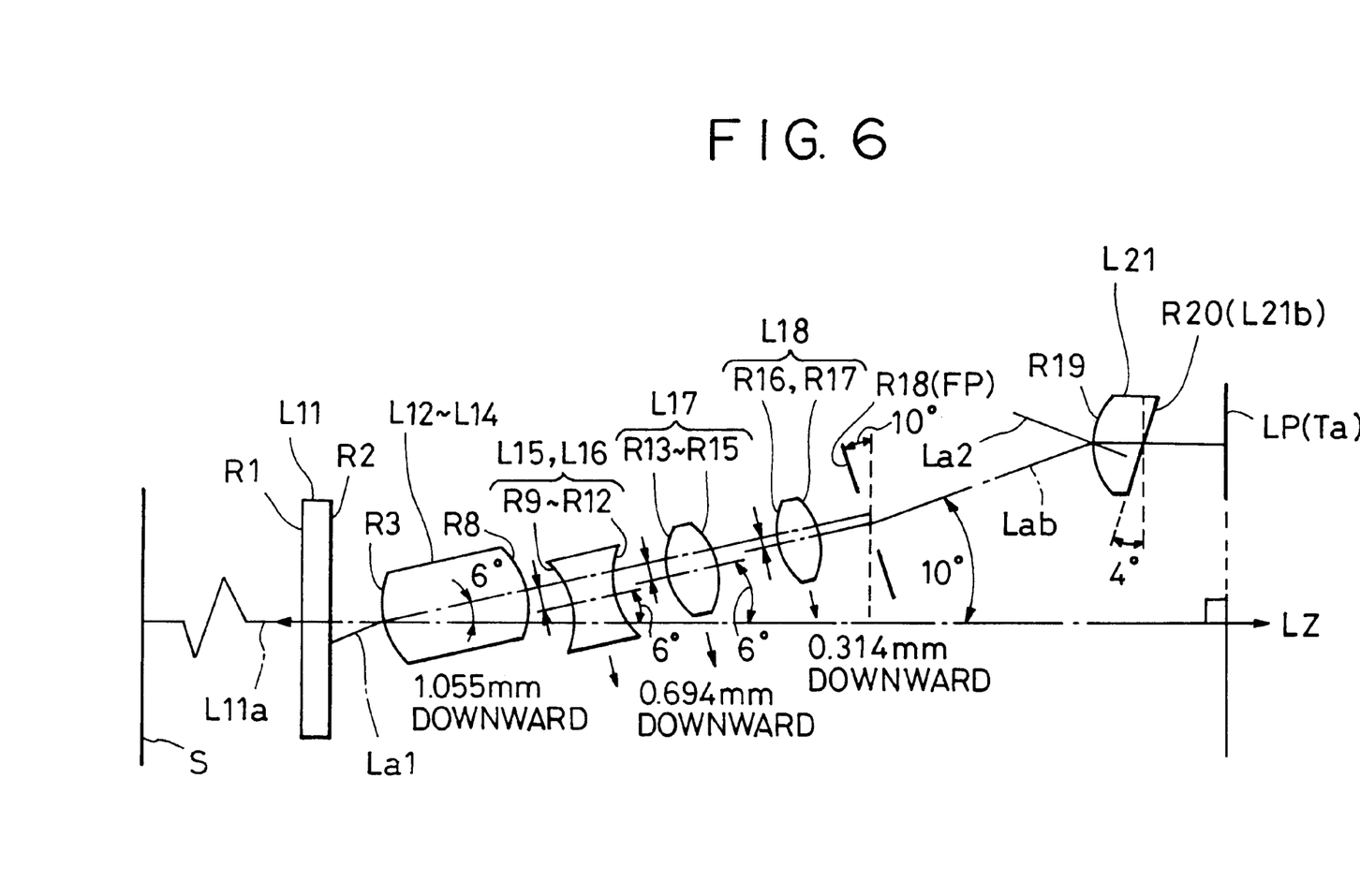
FIG. 6 is a schematic sectional view in the direction of YZ of the second numerical embodiment in accordance with the present invention.

FIG. 4 and FIG. 5 are the YZ and XZ sectional views illustrating the configuration of a second numerical embodiment of the decentered optical system in accordance with the present invention; and FIG. 6 is a schematic sectional view illustrating the lens configuration at the YZ section of the second numerical embodiment.

The second embodiment shares the same lens configuration as the first embodiment shown in FIG. 1; however, the decentered lenses are different.

In FIG. 4 and FIG. 6, the optical axis shared by the second lens L12 to the fourth lens L14 of the first lens unit L1 from the object is defined as the optical axis La1 of the first lens unit L1; the optical axis La1 is tilted counterclockwise by six degrees with respect to the normal line LZ to the projection surface LP. The optical axis L11a of the first lens L11 of the first lens unit L1 from the object is parallel to the normal line LZ to the projection surface LP and inclined clockwise by six degrees with respect to the optical axis La1 of the first lens unit L1. The fourth and fifth lenses of the first lens unit L1 from the object are decentered parallel by 1.055 mm downward in the drawing, i.e. in the direction of Y, in relation to the optical axis La1. The combined positive lens L17 is decentered parallel by 0.694 mm downward in the drawing, i.e. in the direction of Y, in relation to the optical axis La1 of the first lens unit L1.

The eighth positive lens L18 of the first lens unit from the object is decentered parallel by 0.314 mm downward in the drawing in relation to the optical axis La1. Further, the axis Lab connecting the central axis of the entrance pupil EP and the second lens unit L2 is inclined counterclockwise by four degrees in relation to the optical axis La1 and also inclined counterclockwise by ten degrees with respect to the central axis LZ. The lens surface, which is a plane, of the second lens unit L2 on the side of image surface is tilted clockwise by four degrees with respect to the projection surface LP. The stop EP is disposed so that the entrance pupil of the first lens unit L1 is positioned between the first lens unit L1 and the second lens unit L2.

The perpendicular drawn from the center of the curved surface of the lens surface of the lens L21 (the center if the lens surface has a free curved surface) down to the plane L21b is specified as the optical axis La2.

No lens element of the decentered optical system LF is decentered in the XZ section of FIG. 5; the lens elements are coaxial relative to the central axis LZ.

Figure 7:
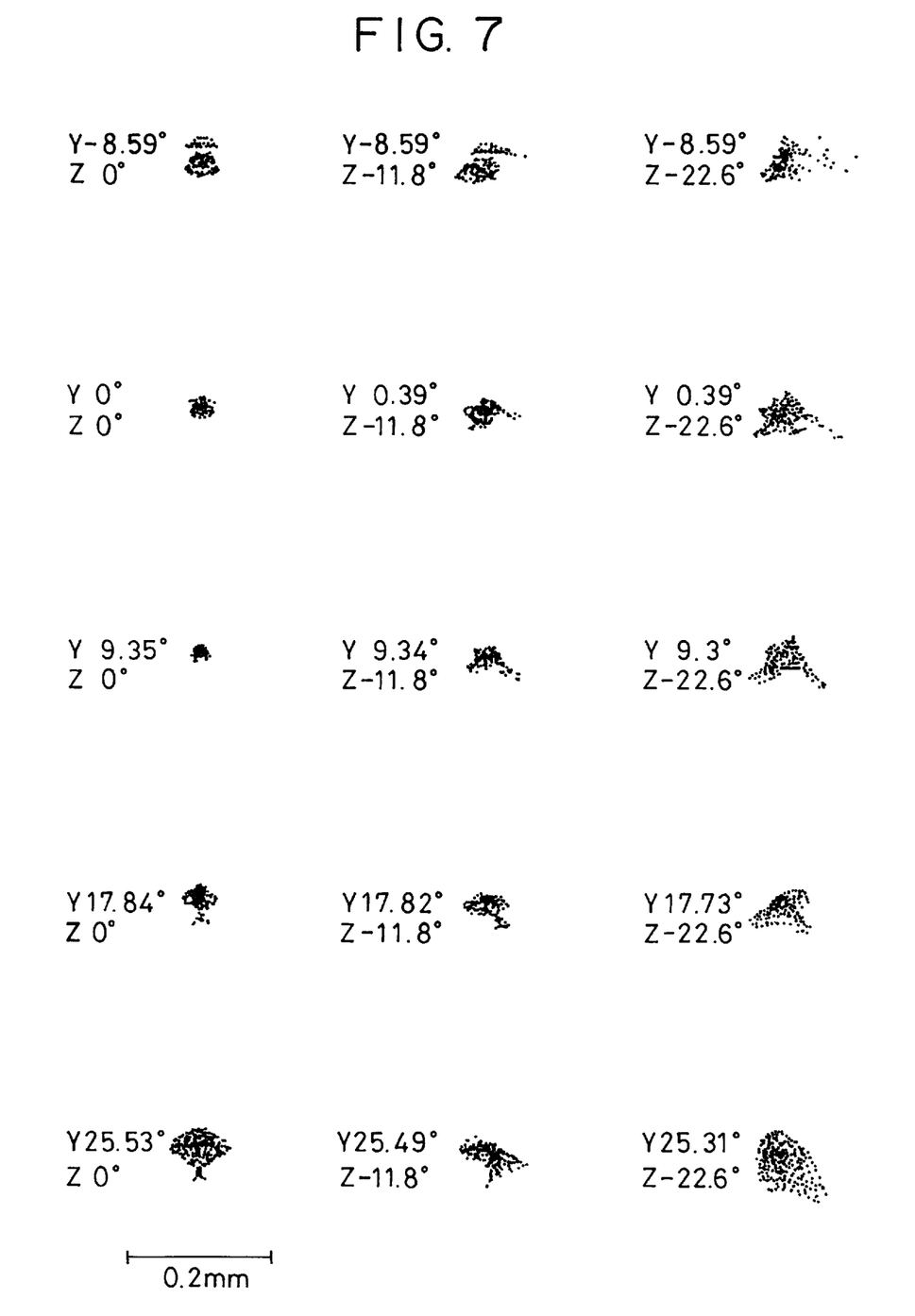
FIG. 7 is a spot diagram of the first numerical embodiment in accordance with the present invention.
Figure 8:
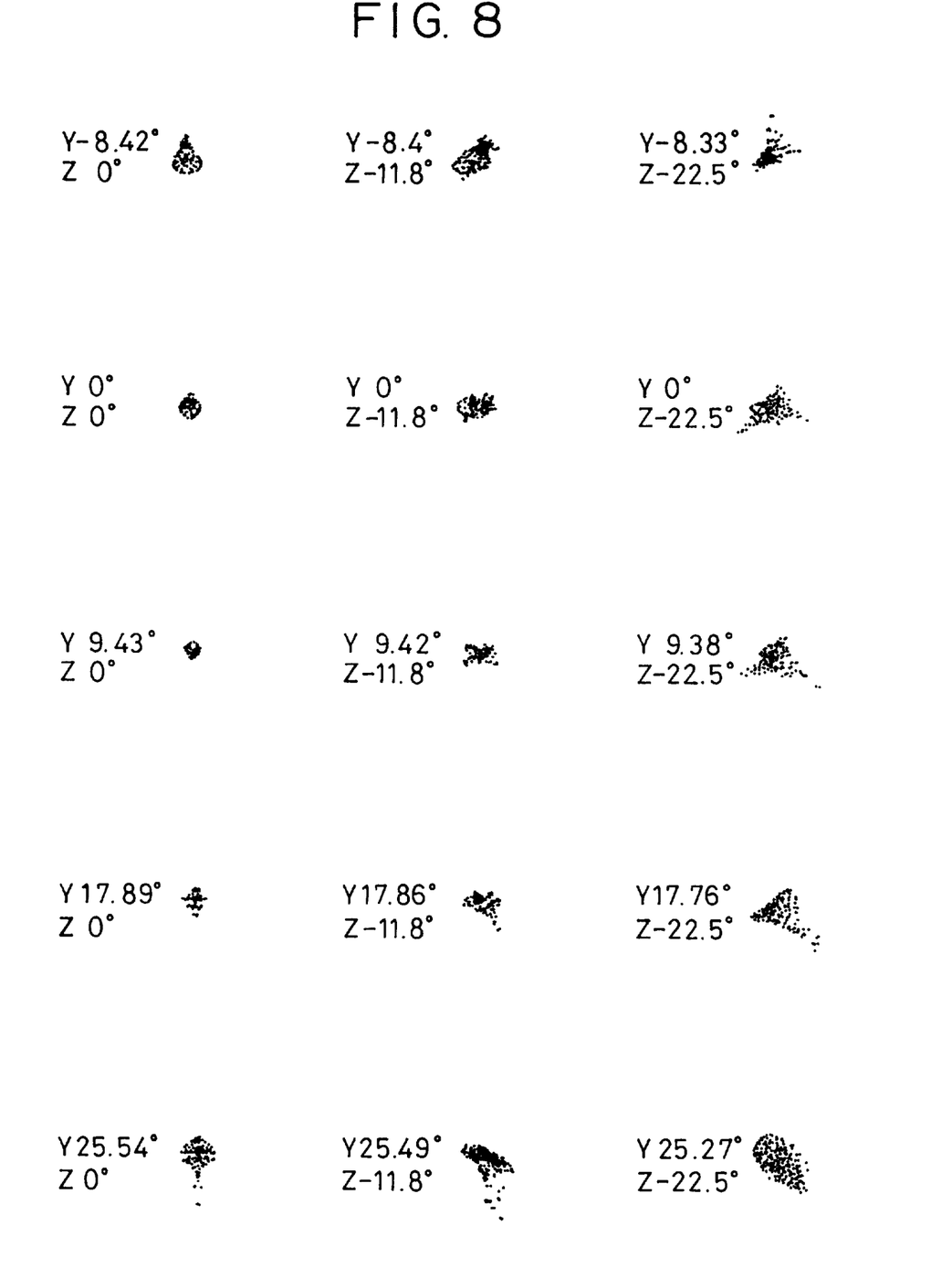
FIG. 8 is a spot diagram of the second numerical embodiment in accordance with the present invention.

FIG. 7 and FIG. 8 show the spot diagrams of the first and second numerical embodiments in accordance with the present invention. The values of Y and Z in the diagrams indicate the exit angles from the projection lens LF on the side of the screen S. The spot diagrams show the states of the image formation on the projection surface LP on the side of the object. As shown in FIG. 7 and FIG. 8, good image forming performance is retained up to the peripheral area of the projection surface LP despite the fact that the system is a decentered optical system.

Figure 9:
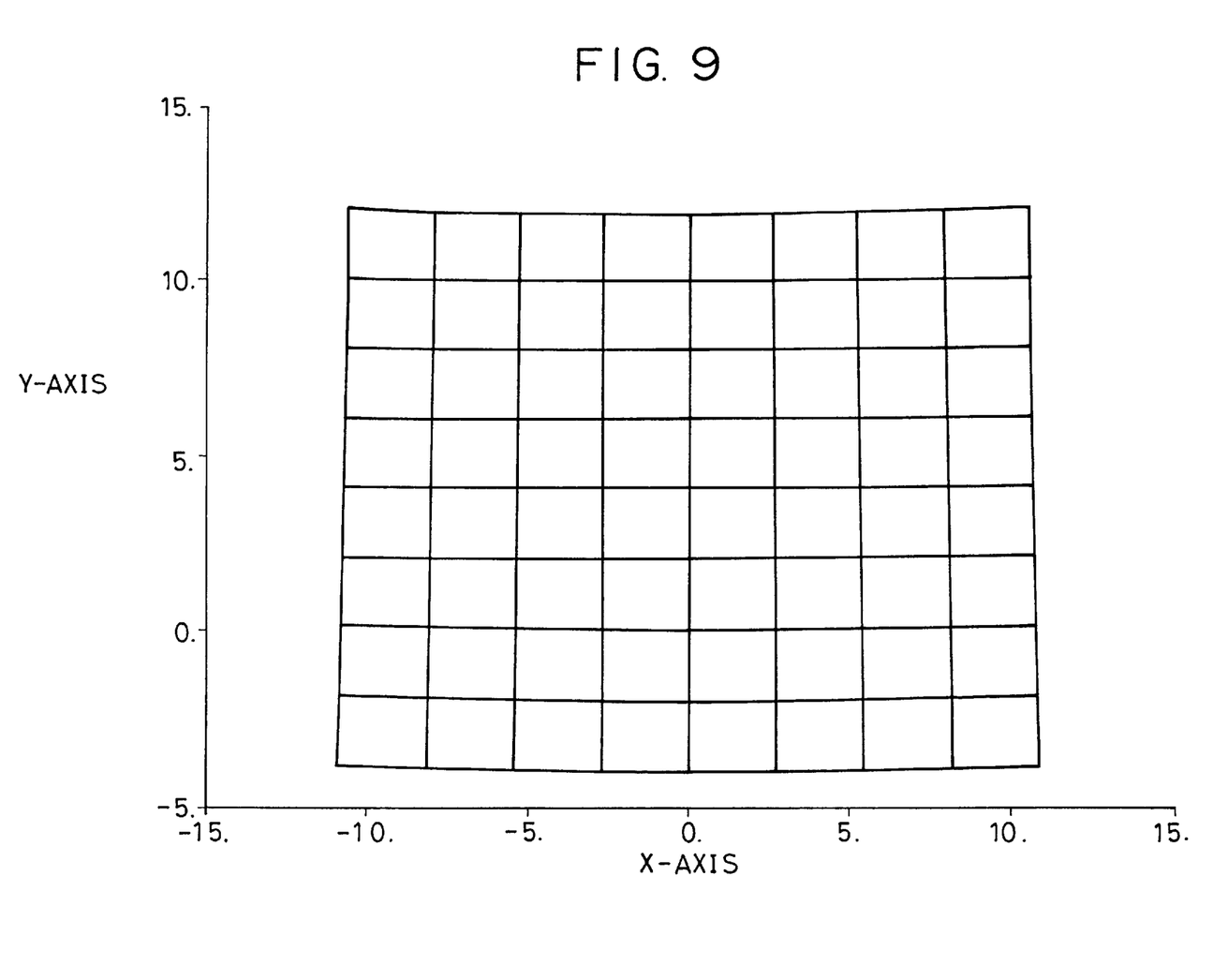
FIG. 9 is a diagram illustrating the distortion of the first numerical embodiment in accordance with the present invention.
Figure 10:
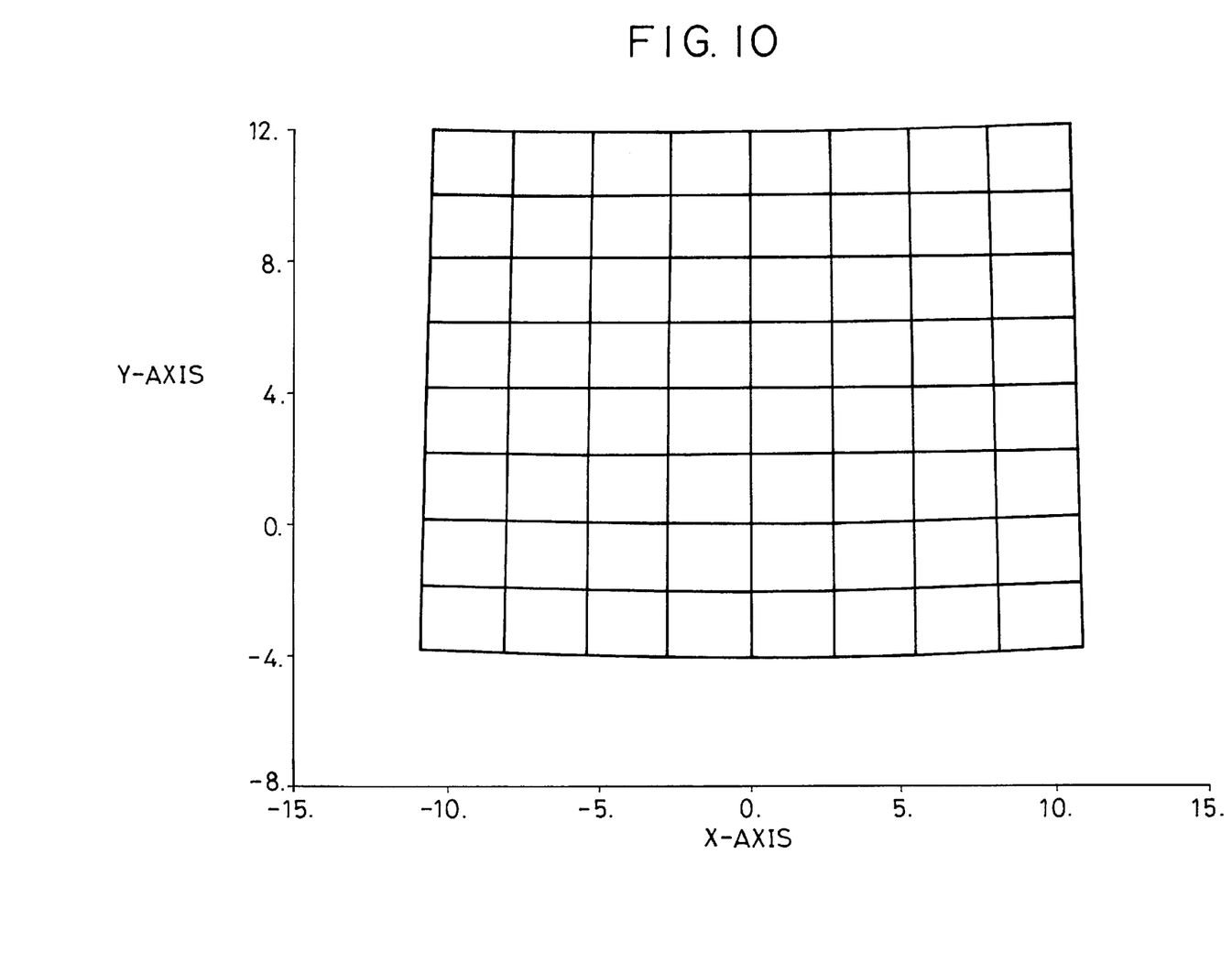
FIG. 10 is a diagram illustrating the distortion of the second numerical embodiment in accordance with the present invention.

FIG. 9 and FIG. 10 are schematic representations illustrative of the distortions observed in the first and second numerical embodiments in accordance with the present invention. As shown in the charts, the trapezoidal distortion is successfully corrected despite the fact that the system is an oblique projection type decentered optical system.

Figure 11:
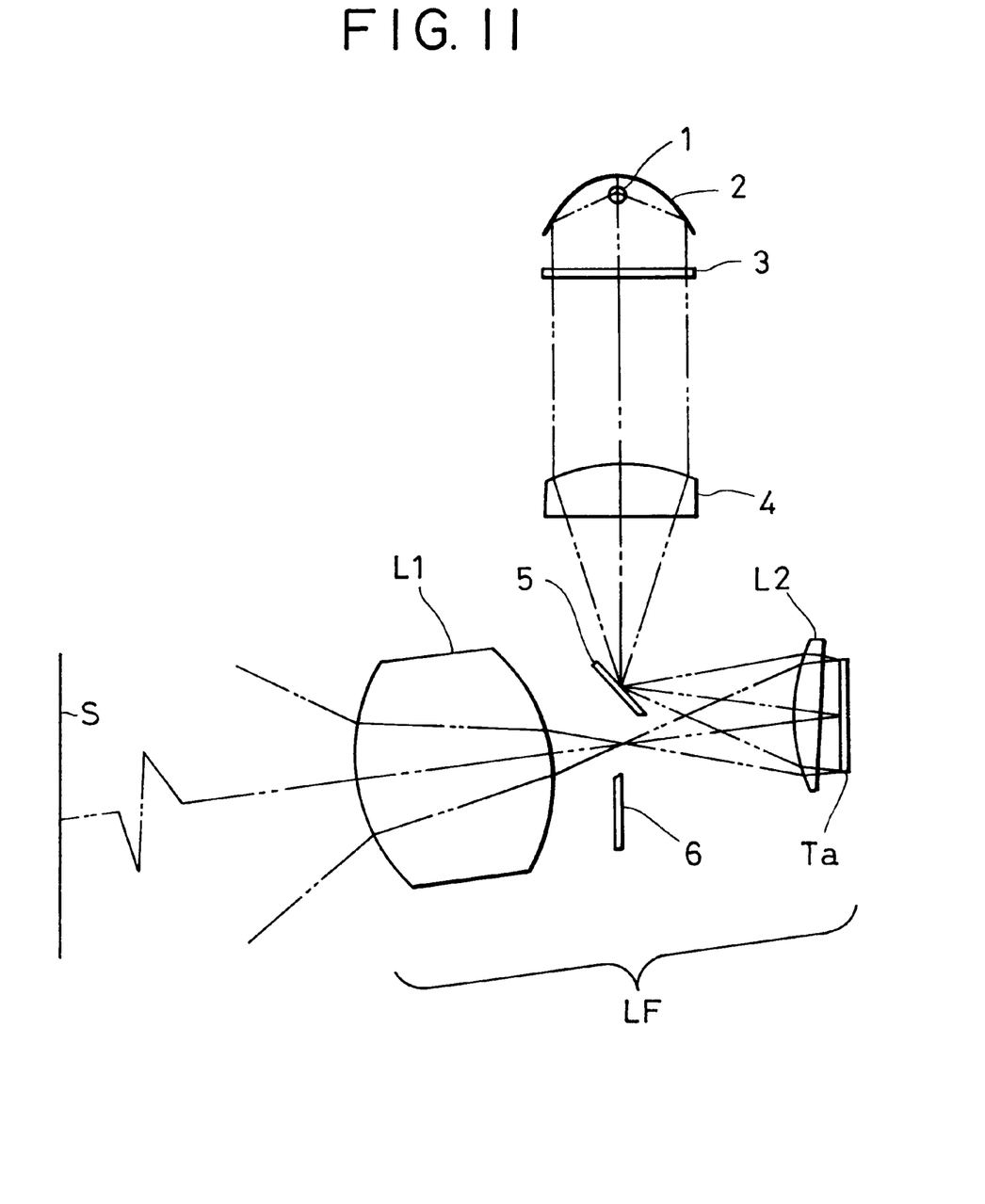
FIG. 11 is a schematic illustration of an essential section of a projecting apparatus in accordance with the present invention.

FIG. 11 is a schematic diagram of an essential section of the first embodiment when the decentered optical system LF in accordance with the present invention is applied to a reflection type image projecting apparatus. In the drawing, LF denotes the decentered optical system. The rays of light emitted from a light source 1 are condensed by a parabolic mirror 2 and formed into parallel rays, and only the rays in a visible range are passed through a filter 3 which blocks infrared rays and ultraviolet rays. The rays which have passed through the filter 3 are condensed through a condensing lens 4 and a light source image is formed on the reflecting surface of a reflecting mirror 5. Then, the illuminating rays emitted from the light source image go through the second lens unit L2 and illuminate a reflection type image modulating device Ta serving as the projection image original picture composed by a liquid crystal display panel or the like.

The illuminating rays applied to the image modulating device Ta are condensed by the second lens unit L2 so that they are turned into parallel rays. The rays of light which have been modulated by the reflection type image modulating device Ta are condensed again at an entrance pupil 6 of the first lens unit L1 through the second lens unit L2, then they are further condensed through the first lens unit L1 before they are projected on the screen S.

According to the present invention, the modulated image rays of light can be converged at the center of the entrance pupil 6 of the first lens unit L1; hence, the f-number of the projecting optical system LF can be increased, permitting simplified projecting lens configuration to be achieved.

The first and second numerical embodiments in accordance with the present invention will now be shown. In the numerical embodiments:

Ri denotes the radius of curvature of the i-th lens surface from the large conjugate side;

Di denotes the lens surface interval of the i-th lens surface from the large conjugate side;

Ni denotes the refractive index of the i-th lens from the large conjugate side;

vi denotes Abbe number of the i-th lens from the large conjugate side;

Ti denotes the tilt decentered amount of the i-th lens from the large conjugate side; and Si denotes the parallel decentered amount of the i-th lens from the large conjugate side.

The configuration of a free curved surface can be defined by the formula shown below:

$$X = ((Y^2 + Z^2)/R)/(1 + (1 - (1 + C1)*(Y^2 + Z^2)/R^2)^{0.5}) +$$
$$C5*(Y^2 - Z^2) + C10*(3*Y^2*Z + 3*Y^3 - 2*Z) +$$
$$C11*(3*Y^2*Z - Z^3) + C12*(Y^4 - 6*Y^2*Z^2 + Z^4) +$$
$$C13*(4*Y^4 - 4*Z^4 - 3*Y^2 + 3*Z^2) +$$
$$C14*(6*Y^4 + 12*Y^2*Z^2 + 6*Z^4 - 6*Y^2 - 6*Z^2 + 1) +$$
$$C20*(10*Z*Y^4 + 20*Y^2*Z^3 + 10*Z^5 -$$
$$12*Y^2*Z - 12*Z^3 + 3*Z) + C21*$$
$$(15*Z*Y^4 + 10*Y^2*Z^3 - 5*Z^5 - 12*Y^2*Z + 4*Z^3) +$$
$$C22*(5*Z*Y^4 - 10*Y^2*Z^3 + Z^5)$$

First Numerical Embodiment: Focal length 26.83 F. No. 2.8

| | | | | |
|---|---|---|---|---|
| R1 = 0 | D1 = 5 | N1 = 1.49171 | v1 = 57.4 | T1 = 0 S1 = 0 |
| R2 = 0 | D2 = 1.5 | | | T2 = 0 S1 = 0 |
| R3 = 55.495 | D1 = 11.4 | N1 = 1.51633 | v1 = 64.2 | T3 = 6 S1 = 0 |
| R4 = 2665.348 | D1 = 0.2 | | | T4 = 6 S1 = 0 |
| R5 = 35.728 | D1 = 2.5 | N1 = 1.60311 | v1 = 60.3 | T5 = 6 S1 = 0 |
| R6 = 20.790 | D1 = 11.42 | | | T6 = 6 S1 = 0 |
| R7 = −65.396 | D1 = 2 | N1 = 1.60311 | v1 = 60.7 | T7 = 6 S1 = 0 |
| R8 = 20.733 | D1 = 16.65 | | | T8 = 6 S1 = 0 |
| R9 = 347.320 | D1 = 2 | N1 = 1.65844 | v1 = 50.9 | T9 = 6 S1 = 0 |
| R10 = 38.758 | D1 = 5.5 | | | T10 = 6 S1 = 0 |
| R11 = 50.344 | D1 = 8.1 | N1 = 1.84666 | v1 = 23.4 | T11 = 6 S1 = 0 |
| R12 = −95.650 | D1 = 15.32 | | | T12 = 6 S1 = 0 |
| R13 = −67.066 | D1 = 2.2 | N1 = 1.84666 | v1 = 23.4 | T13 = 6 S1 = −0.5 |
| R14 = 37.192 | D1 = 13.31 | N1 = 1.60311 | v1 = 60.7 | T14 = 6 S1 = −0.5 |
| R15 = −31.851 | D1 = 0.2 | | | T15 = 6 S1 = −0.5 |

-continued

| | | | | | |
|---|---|---|---|---|---|
| R16 = 70.681 | D1 = 5.37 | N1 = 1.60311 | ν1 = 60.7 | T16 = 6 | S1 = −2.71 |
| R17 = −182.392 | D1 = 15 | | | T17 = 6 | S1 = −2.71 |
| R18 = 0 (Stop) | D1 = 56.98 | | | T18 = 10 | S1 = −2.71 |
| R19 = 26.321 | D1 = 8 | N1 = 1.49171 | ν1 = 57.4 | T19 = 0 | S1 = 0 |
| R20 = 0 | D1 = 0 | | | T20 = −4 | S1 = 0 |

Free Curved Surface Coefficient of R1

C1 = 0            C5 = 1.5192E-4      C6 = −2.4194E-4    C10 = −5.5662E-6
C11 = 4.2100E-8   C12 = −7.7006E-9    C13 = 2.3985E-8    C14 = 6.0281E-9
C20 = −8.5620E-11 C21 = 2.675E-10     C22 = −5.8574E-11

Free Curved Surface Coefficient of R19

C1 = 1.7707E-2    C5 = 5.6876E-4      C6 = −9.6456E-5    C10 = −1.2043E-5
C11 = 3.4429E-6   C12 = −7.6207E-7    C13 = 6.3333E-7    C14 = −1.3500E-7
C20 = −1.2126E-8  C21 = 1.6131E-8     C22 = −1.8725E-8

Second Numerical Embodiment: Focal length 26.83 F. No. 2.8

| | | | | | |
|---|---|---|---|---|---|
| R1 = 0 | D1 = 5 | N1 = 1.49171 | ν1 = 57.4 | T1 = 0 | S1 = 0 |
| R2 = 0 | D2 = 1.5 | | | T2 = 0 | S1 = 0 |
| R3 = 55.495 | D1 = 11.4 | N1 = 1.51633 | ν1 = 64.2 | T3 = 6 | S1 = 0 |
| R4 = −2665.348 | D1 = 0.2 | | | T4 = 6 | S1 = 0 |
| R5 = 35.728 | D1 = 2.5 | N1 = 1.60311 | ν1 = 60.7 | T5 = 6 | S1 = 0 |
| R6 = 20.790 | D1 = 11.42 | | | T6 = 6 | S1 = 0 |
| R7 = −65.396 | D1 = 2 | N1 = 1.60311 | ν1 = 60.7 | T7 = 6 | S1 = 0 |
| R8 = 20.733 | D1 = 16.65 | | | T8 = 6 | S1 = 0 |
| R9 = 347.320 | D1 = 2 | N1 = 1.65844 | ν1 = 50.9 | T9 = 6 | S1 = −1.055 |
| R10 = 38.758 | D1 = 5.5 | | | T10 = 6 | S1 = −1.055 |
| R11 = 50.344 | D1 = 8.1 | N1 = 1.84666 | ν1 = 23.4 | T11 = 6 | S1 = −1.055 |
| R12 = −95.650 | D1 = 15.32 | | | T12 = 6 | S1 = −1.055 |
| R13 = −67.066 | D1 = 2.2 | N1 = 1.84666 | ν1 = 23.4 | T13 = 6 | S1 = −0.694 |
| R14 = 37.192 | D1 = 13.31 | N1 = 1.60311 | ν1 = 60.7 | T14 = 6 | S1 = −0.694 |
| R15 = −31.851 | D1 = 0.2 | | | T15 = 6 | S1 = −0.694 |
| R16 = 70.681 | D1 = 5.37 | N1 = 1.60311 | ν1 = 60.7 | T16 = 6 | S1 = −0.314 |
| R17 = −182.392 | D1 = 15 | | | T17 = 6 | S1 = −0.314 |
| R18 = 0 (Stop) | D1 = 56.98 | | | T18 = 10 | S1 = −0.314 |
| R19 = 26.321 | D1 = 8 | N1 = 1.49171 | ν1 = 57.4 | T19 = 0 | S1 = 0 |
| R20 = 0 | D1 = 0 | | | T20 = −4 | S1 = 0 |

Free Curved Surface Coefficient of R1

C1 = 0             CS = 1.4631E-4     C6 = 1.7963E-4     C10 = −3.4573E-6
C11 = −6.3866E-8   C12 = −1.6316E-8   C13 = 3.0739E-8    C14 = −1.0696E-8
C20 = −2.1218E-10  C21 = 3.1651E-10   C22 = −1.0985E-10

Free Curved Surface Coefficient of R19

C1 = −8.8296E-2   C5 = 6.8440E-4     C6 = −1.3390E-5    C10 = −1.0908E-5
C11 = −3.8723E-6  C12 = −4.9714E-7   C13 = 3.5785E-7    C14 = −3.4535E-7
C20 = 1.5015E-9   C21 = 1.5685E-8    C22 = −1.2846E-8

Thus, the present invention makes it possible to achieve a decentered optical system which is capable of successfully correcting trapezoidal distortion, distortive aberration, the fall of an image surface, etc. when obliquely projecting a projection image original picture, while reducing the size of the entire optical system and maintaining the optical characteristics as good as those obtained by screen shift at the same time, by decentering some lenses of the optical system, and also to achieve a projecting apparatus which employs the decentered optical system.

The present invention realizes, in particular, a decentered optical system which minimizes the occurrence of trapezoidal distortion or the fall of projected image and which requires a smaller lens aperture as compared with the screen shift even for oblique projection. Furthermore, the center of an original picture image on a liquid crystal surface and the center of the entrance pupil of a projection lens can be shifted, providing such advantages as higher lighting efficiency especially in a liquid crystal projector which employs a reflection type liquid crystal.

What is claimed is:

1. A decentered optical system comprising:
    a first lens unit of positive refractive power and a second lens unit of positive refractive power in an order in which they are listed from a first conjugate surface at a longer distance,
    wherein each of said first lens unit and said second lens unit includes at least one lens surface which is tilted and decentered with respect to a normal line to a second conjugate surface at a shorter distance.

2. A decentered optical system according to claim 1, wherein the first conjugate surface and the second conjugate surface are parallel.

3. A decentered optical system according to claim 1, wherein a normal line based on a center of the first conjugate surface does not coincide with a normal line based on a center of the second conjugate surface.

4. A decentered optical system according to claim 1, 2, or 3, wherein lens surfaces in said first lens unit and said second lens unit which are tilted and decentered with respect to the normal line to the second conjugate surface are tilted in different directions from each other with respect to the second conjugate surface,
    wherein said first lens unit comprises a lens which is tilted and decentered with respect to the normal line to the second conjugate surface, and
    wherein a lens sirface of said lens of said first lens unit is tilted, with respect to the normal line to the second conjugate surface, in the same direction as the direction in which a line connecting a center of the first conjugate surface and a center of the second conjugate surface is tilted with respect to the normal line to the second conjugate surface.

5. A decentered optical system according to claim 1, wherein said second lens unit is composed of a single positive lens and the lens surface thereof on the side of the first conjugate surface relatively has greater positive refractive power than the lens surface on the side of the second conjugate surface.

6. A decentered optical system according to claim 5, wherein said positive lens in said second lens unit is composed of a planoconvex lens with its convex surface facing to the first conjugate surface.

7. A decentered optical system according to claim 1, wherein each of said first lens unit and said second lens unit includes a free curved surface having one or less axis of symmetry.

8. A decentered optical system according to claim 7, wherein the free curved surface included in said first lens unit is positioned closer to the first conjugate surface than a center, with respect to an overall length, of said first lens unit.

9. A decentered optical system according to any one of claims 1, 2, 3, 5, 6, 7, or 8, wherein said first lens unit comprises a plurality of lenses, and at least one among said plurality of lenses is decentered with respect to an optical axis of said first lens unit.

10. A decentered optical system according to claim 1, wherein a pupil of said first lens unit on the side of the second conjugate surface is located between said first lens unit and said second lens unit.

11. A decentered optical system according to claim 1, wherein said first lens unit and said second lens unit are disposed with a largest air interval, of air intervals of said decentered optical system, provided therebetween.

12. A decentered optical system according to claim 1, wherein said first lens unit comprises a free curved surface lens having a free curved surface, a plurality of lenses having optical axes tilted and decentered relative to the normal line to the second conjugate surface, and a plurality of lenses decentered parallel in relation to the optical axes, in the order in which they are listed from the side of the first conjugate surface.

13. A decentered optical system according to claim 12, wherein a stop, which is tilted with respect to the axis of center, is disposed on the side of the second conjugate surface of said first lens unit.

14. A decentered optical system according to claim 13, wherein said second lens unit is composed of a planoconvex lens which has a plane surface tilted in relation to said second conjugate surface.

15. A projecting apparatus which employs the decentered optical system according to claim 1, and which projects a projection image original picture provided on the second conjugate surface onto a screen surface provided on the first conjugate surface.

16. A decentered optical system according to claim 4, wherein said first lens unit has a plurality of lenses, and at least one among said plurality of lenses is decentered with respect to an optical axis of said first lens unit.

17. A decentered optical system according to claim 1, wherein said first lens unit comprises in order from the first conjugate surface to the second conjugate surface (a) a free curved surface lens wherein the lens surface thereof on the side of the first conjugate surface is a free curved surface, (b) a positive lens having high positive power on the side thereof facing the first conjugate surface, (c) a meniscus negative lens having its convex surface facing the first conjugate surface, (d) a biconcave negative lens, (e) a negative lens having high negative power on the side thereof facing the second conjugate surface, (f) a biconvex positive lens, (g) a cemented positive lens composed of a negative lens and a positive lens bonded together and having high positive power on the side thereof facing the second conjugate surface, and (h) a positive lens.

18. A decentered optical system according to claim 1, wherein said second lens unit is composed of a planoconvex positive lens, and wherein the convex surface of said planoconvex positive lens faces toward the first conjugate surface and is a free curved surface.

19. A reflection type image projecting apparatus, comprising:

a decentered optical system comprising, in order from a first conjugate surface at a long distance to a second conjugate surface at a shorter distance, a first lens unit of positive refractive power and a second lens unit of positive refractive power, wherein each of said first lens unit and said second lens unit includes at least one lens surface which is tilted and decentered with respect to a normal line to the second conjugate surface; and reflecting means for reflecting illuminating rays onto a reflection type image modulating device to provide a projection image original picture on the second conjugate surface.

* * * * *

UNITED STATES PATENT AND TRADEMARK OFFICE
CERTIFICATE OF CORRECTION

PATENT NO. : 5,986,806

DATED : November 16, 1999

INVENTOR(S) : SABURO SUGAWARA

It is certified that error appears in the above-identified patent and that said Letters Patent is hereby corrected as shown below:

<u>COLUMN 8</u>
Line 26, "vi" should read --ѵi--.

<u>COLUMN 10</u>
Line 63, "sirface" should read --surface--.

Signed and Sealed this

Twenty-eighth Day of November, 2000

Attest:

Q. TODD DICKINSON

*Attesting Officer*  *Director of Patents and Trademarks*